Figures 1, 2:
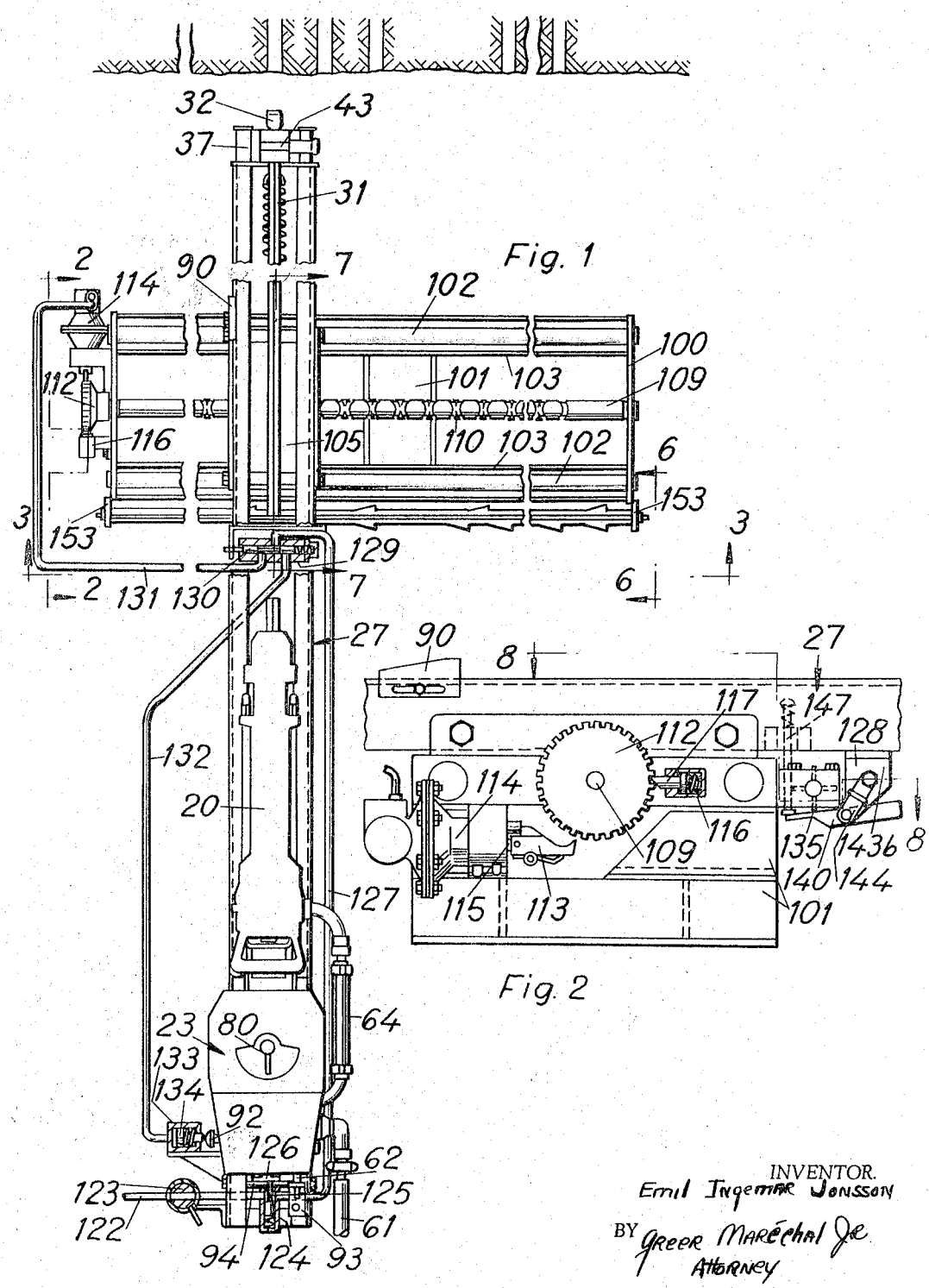

March 7, 1967  E. I. JONSSON  3,307,637
AUTOMATED ROCK DRILL POSITIONING SUPPORT
Filed June 23, 1964  3 Sheets-Sheet 1

INVENTOR.
Emil Ingemar Jonsson
BY Greer Maréchal Jr
Attorney

March 7, 1967  E. I. JONSSON  3,307,637
AUTOMATED ROCK DRILL POSITIONING SUPPORT
Filed June 23, 1964  3 Sheets-Sheet 2
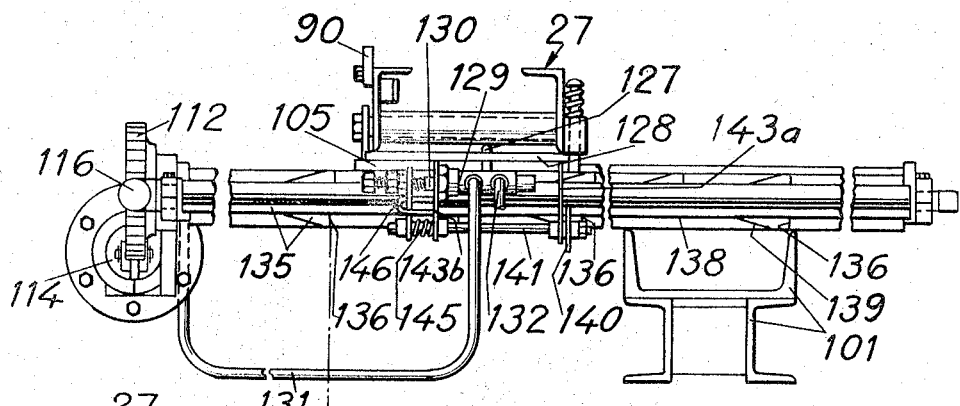
Fig. 3
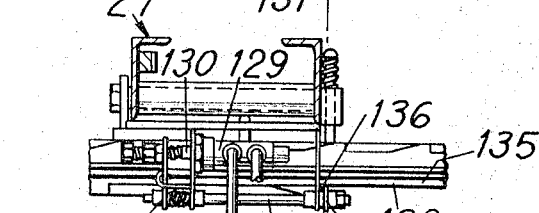
Fig. 4
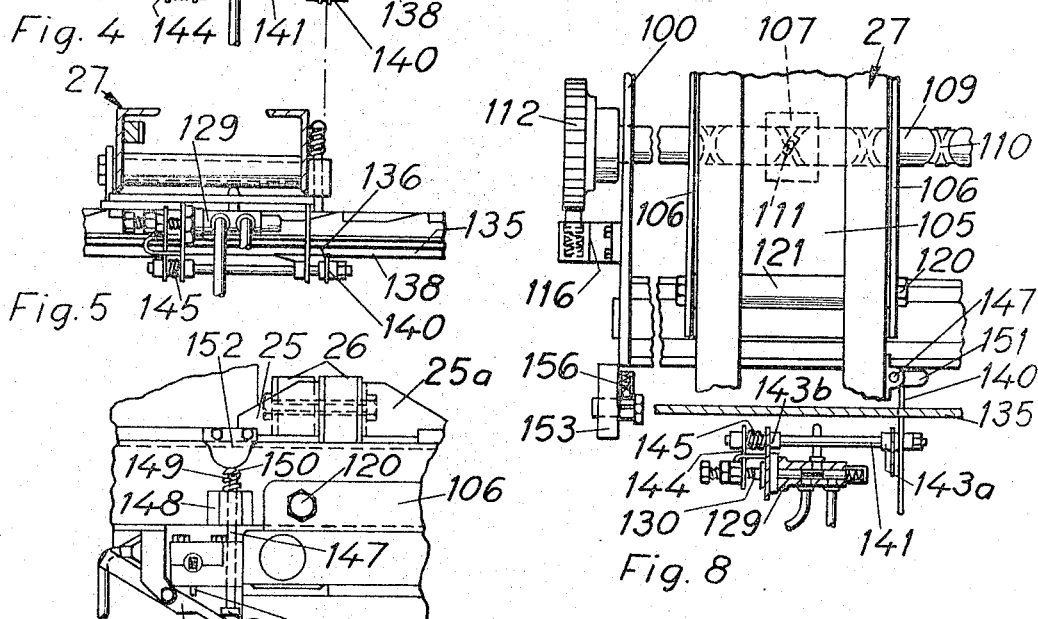
Fig. 5
Fig. 6
Fig. 8
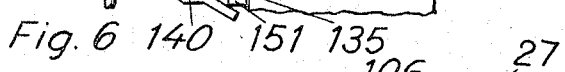
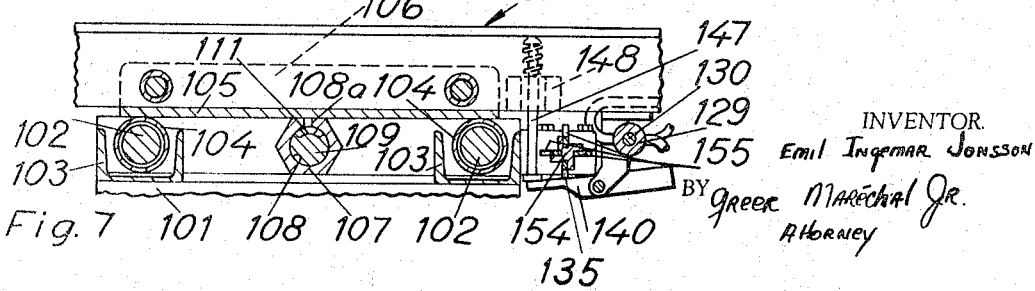
Fig. 7
INVENTOR.
Emil Ingemar Jonsson
BY Greer Marechal Jr.
Attorney

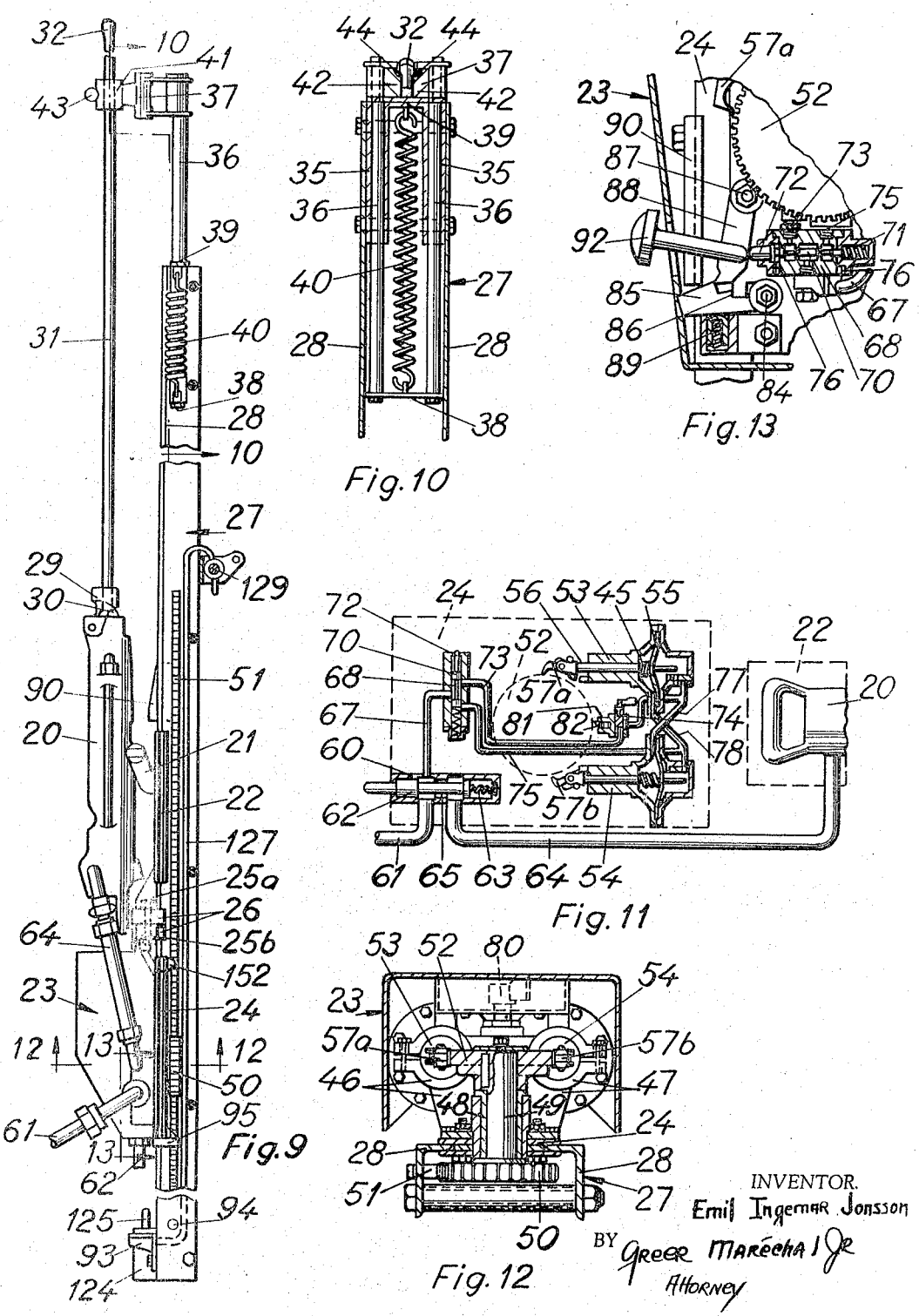

United States Patent Office 3,307,637
Patented Mar. 7, 1967

3,307,637
AUTOMATED ROCK DRILL POSITIONING
SUPPORT
Emil Ingemar Jonsson, Lycksele, Sweden, assignor to Atlas Copco Aktiebolag, Nacka, Sweden, a corporation of Sweden
Filed June 23, 1964, Ser. No. 377,289
19 Claims. (Cl. 173—44)

This invention relates generally to rock drill positioning supports and more specifically to a rock drill support for automatically positioning a rock drill to a plurality of predetermined successive drilling locations for fully automated drilling of a row of spaced holes.

One object of the invention is to provide an automated rock drill positioning support in which a feed shell with the appurtenant rock drill and drill steel thereon can be automatically moved and positioned from one drilling location to the next in any of a plurality of successive drilling locations as soon as the rock drill has been moved in backward direction away from the rock face to a certain position on the shell. Another object of the invention is to provide an automated rock drill support in which a series of spaced holes disposed in a row can be drilled automatically according to a predetermined selective program for the spacing between the holes. A further more specific object of the invention is to use an endless screw for the automated transverse positioning of a feed shell with the appurtenant rock drill steel thereon. A still further object of the invention is to provide an automated rock drill positioning support on which the feed shell with the appurtenant rock drill and drill steel thereon has an automatically retractable drill steel centralizer deriving its movement from the movement of the rock drill. This enables the feed shell to perform automated transverse translatory motion in planes disposed substantially parallel with the rock face from one drilling location to the next without hindrance from irregularities of the rock face.

The above and other objects of the invention will become obvious from the following description and from the accompanying drawings in which an embodiment of the invention is illustrated by way of example. It should be understood that this embodiment is only illustrative of the invention and that various modifications may be made within the scope of the claims without departing from the scope of the invention.

In the drawings FIG. 1 is a fragmentary top plan view of a rock drill support according to the invention with a portion of the feed shell being cut away to show underlying parts. FIG. 2 is an enlarged view on line 2—2 in FIG. 1. FIG. 3 is an enlarged view on line 3—3 in FIG. 1. FIGS. 4 and 5 show a portion of FIG. 3 depicting two stages of the transverse movement of the feed shell. FIG. 6 is an enlarged view on line 6—6 in FIG. 1 with the rock drill in intermediate position on the feed shell. FIG. 7 is an enlarged sectional view on line 7—7 in FIG. 1. FIG. 8 is a partly sectional view substantially on line 8—8 in FIG. 2. FIG. 9 is a partly sectional fragmentary side view depicted in vertical position of the normally horizontal feed shell in FIG. 1 with one of the side channels of the feed shell removed for showing inside parts. FIG. 10 is a section on line 10—10 in FIG. 9 but with the drill steel centralizer in retracted position. FIG. 11 is a diagrammatic pressure fluid circuitry for the feeding motor mechanism which is slidable on the feed shell for feeding and retracting the rock drill. FIG. 12 is an enlarged sectional view on line 12—12 in FIG. 9 and FIG. 13, finally, is an enlarged fragmentary sectional view substantially on line 13—13 in FIG. 9 and showing the one corner portion of the feeding motor mechanisms with the reversing valve and appurtenant mechanisms.

Referring to the drawings, in FIGS. 9–13 there is shown a feed shell provided with automated feeding and retraction of the rock drill carried thereby. On this shell upon starting of the forward feed a drill steel centralizer as projected forwardly, a hole is then drilled to the desired depth, the feed is thereupon automatically switched to backward feed whereby the rock drill is returned to a rearward position on the feed shell, and the centralizer is then finally retracted away from the rock face. Any suitable automatic feeding system and shell satisfying the above functions may be used in connection with the present automated rock drill positioning support, but it is preferred to use the automatized feeding device for rock drills disclosed in my copending U.S. patent application Serial Number 235,961 now Patent No. 3,204,706. For purposes of full understanding there will therefore be given a brief description of the parts of the above disclosure which are of importance in connection with or which are forming part of the present invention. In FIGS. 9–13 a rock drill 20 of the percussive compressed air driven type is mounted by means of a bracket 21 on a slide 22. A feeding motor mechanism 23 is mounted on another slide 24. The slides 22 and 24 are provided with opposed brackets 25a, b, respectively, which are interconnected by means of a bolt connection including a pair of rubber buffers 26 whereby an axially compressible connetion is provided between the slides 22, 24. The slides 22, 24 are provided with guideways and are slidably mounted on a feed shell 27 consisting of suitably interconnected parallel angle irons 28.

The rock drill 20 carries pivotally at its front end a retainer 29 which engages the drill steel collar 30 to prevent axial withdrawal of the drill steel 31 when pivoted to occupy the position of FIG. 9. Forwardly the drill steel 31 has the usual enlarged drill bit 32.

At the front end and inside of the shell 27 there are affixed parallel sleeves 35, slidably accommodating the supporting rods 36 of a drill steel centralizer 37. A transverse plate 38 is bolted to the inner ends of the rods 36. A front plate 39 is attached to the shell 27 extending between the angle irons 28. Between the plates 38, 39 extends a helical draw spring 40 for urging the drill steel centralizer 37 in forward direction relative to the shell 27 to the position depicted in FIG. 9. The centralizer 37 includes a pair of conventional spaced guide arms 41 pivotally arranged on the centralizer body and carrying guide jaws 42. When brought together to guiding position the jaws 42 form a cylindrical guide opening closely surrounding and supporting the drill steel 31. The jaws 42 may be locked in guiding position by means of a bolt 43, FIG. 1, releasably locking the jaws together. Forwardly the guide opening has a widened portion defining shoulders 44 in the jaws 42 against which the drill bit 32 abuts when the drill steel 31 is retracted rearwardly sufficiently to bring the bit in engagement with the jaws 42, FIG. 10.

Centrally in the slide 24 of the feed motor mechanism 23 there is provided a vertical bearing 48 in which a shaft 49 is rotatably journalled. Fixedly connected to the lower end of the shaft 49 is a gear 50 which is in constant engagement with a rack 51 extending longitudinally of the shell 27 and connected to one of its angle irons 28 by suitable bolts. To the upper end of the shaft 49 there is keyed a cogwheel 52. For rotating the cogwheel 52 in either direction there are mounted in brackets 46, 47 on the slide 24 two separate pressure fluid driven motors of the reciprocating diaphragm motor type, one designated 53 for imparting forwarding feed movement to the slide 24 and the other designated 54 for imparting backward feed movement thereto. The working element of these motors is a diaphragm 55, FIG. 11, which is reciprocated by means of pressure fluid acting intermittently at one side thereagainst and a return spring 45 acting against the other side thereof. Hereby a driving rod 56 connected to the diaphragm 55 is reciprocated. The driving rods 56 of the motors 53, 54 carry pivotally thereon pawls 57a, b respectively which when one of the rods 56 is reciprocating intermittently engages with the cogwheel 52 producing the driving thereof in one direction or the other. The two motors 53, 54 are mounted at opposed sides of the cogwheel 52 with the rods 56 disposed substantially tangentially thereto. It is deemed unnecessary to describe in detail hereinafter the design of the diaphragm motors 53, 54 since they are fully disclosed in the above mentioned specification Ser. No. 235,961.

A supply valve 60 is connected to the rear of the slide 24 and extends longitudinally of the feeding motor mechanism 23, FIG. 11. A hose 61 for supplying compressed air is connected to the valve 60. In the supply valve 60 there is provided a slidable valve body 62 actuated by a biasing spring 63 which urges the valve body 62 to the position illustrated in FIG. 11. In such position the valve body 62 protrudes to the rear from the supply valve 60 and a communication is established therein between the nose 61 and a conduit 64 leading to the rock drill 20 so that compressed air is supplied to drive the rock drill. Depression of the valve body 62 defines another position of the supply valve 60 in which the valve body 62 closes an aperture in a partition 65 in the valve 60. The communication to the conduit 64 is closed hereby so that the rock drill 20 is stopped.

A widened portion is provided in the valve 60 for establishing constant communication between the hose 61 and a conduit 67 leading to a reversing valve 68, FIGS. 11 and 13. Slidably arranged in the reversing valve 68 is a valve body 70 urged by a biasing spring 71 in outward direction. The valve body 70 carries a button 72 at its end protruding from the valve 68. The valve body 70 is capable of occupying two distinct positions, a forward feed position with the button 72 depressed, in which pressure fluid from the conduit 67 is directed by grooves on the valve body 70 to a conduit 73 leading via a reduction valve 74 to the diaphragm motor 53, and a backward feed position, FIG. 13, with the button in its protruding position, for directing pressure fluid from the conduit 67 to a conduit 75 leading to the diaphragm motor 54. The arrangement is such that while compressed air is directed to one of the conduits 73, 75, the other of said conduits is vented to the atmosphere via one of a pair of exhaust openings 76 in the reversing valve 68.

In order to perform subsequently to shifting of the reversing valve 68 a rapid retraction and keeping in retracted position of the pawl 57a or 57b of the diaphragm motor which by the shifting has been connected to one of the exhaust openings 76, there are provided cross-conduits 77, 78 between each of the conduits 73, 75 and the spring chamber of the other diaphragm motor. Thereby is provided a guarantee that the driving pawl 57a or 57b of the diaphragm motor to be set idle is always retracted before the pawl 57b or 57a of the other motor starts its working stroke. The pressure reduction valve 74 in the conduit 73 is provided with a lever 80 by which the pressure for actuating the diaphragm motor 53 for forward feed may be adjusted.

Adjacent the pressure reduction valve 74 there is provided a small cylinder 81 which communicates with the valve 74 and slidably accommodates a plunger 82 with an outwardly projecting stem having a detent formed thereon at the tip thereof. A spring, not shown, is inserted between the plunger 82 and the cylinder 81 for urging the plunger inwardly into the cylinder. As soon as the conduit 73 is pressurized, however, the plunger 82 will be urged in the outward direction engaging by means of its detent the periphery of the cogwheel 52. The plunger 82 and its detent form a one-way slip device which under forward feed of the feeding motor mechanism prevents rotation of the cogwheel 52 in the backward feed direction.

As soon as the conduit 73 is vented, the plunger will be retracted by its spring giving the cogwheel 52 freedom to rotate in the direction in which backward feed is performed.

The reversing valve 68 is mounted transversely on the slide 24. Adjacent its button 72 there are provided means on the slide for locking and for keeping the valve body 70 depressed against the bias of its spring 71. As shown in FIG. 13, there is provided on an upstanding pivot 84 on the slide 24 a swingable transverse lever 85 having a notch 86 thereon. On another pivot 87 there is provided a second swingable lever 88 extending longitudinally of the slide 24 and engaging with the button 72 of the valve body 70. The outer end of the lever 88 can be engaged by the notch 86 on the transverse lever 85 and in such position the button 72 and valve body 70 are kept depressed and locked in the forward feed position. A spring pressed plunger 89 coacts with the back of the lever 85 for keeping the notch 86 in engagement with the longitudinal lever 88. The outer end of the transverse lever 85 is capable of engaging with a cam plate 90 connected to one side forwardly on the shell 27 as by suitable bolts. The cam plate 90 can be adjusted longitudinally of the shell 27 for which purpose there may be provided spaced alternative holes for the bolts of the cam plate 90 along the shell 27. When engaged by the cam plate 90 the transverse lever 85 moves against the action of the plunger 89 until the notch 86 is displaced beyond the outer end of the longitudinal lever 88, whereupon the biasing spring 71 presses the valve body 70, the button 72, and the longitudinal lever 88 outwardly thereby shifting the reversing valve 68 to backward feed position. An operating member 92 is connected to the longitudinal lever 88 so that the button 72 may be depressed at will, and provided the cam plate 90 is out of contact with the transverse lever 85, such depression will produce locking of the longitudinal lever 88 in depressed position thanks to the notch 86 so that the valve 70 will be kept in the forward feed position.

For cooperation with the rearwardly protruding stem of the supply valve body 62 there is mounted by means of suitable bolts a longitudinally adjustable abutment plate 93 at the rear end of the feed shell 27. The plate 93 is positioned on the shell 27 in a manner to be capable of fully depressing the valve body 62 when the feeding motor mechanism has reached its rearmost position on shell 27. Such rearmost position may be defined by a transverse abutment bar 94 fixedly connected to the rear end of the feed shell 27 and engaged by a projection 95 on the rear end of the slide 24, FIGS. 1 and 9, when the feeding motor mechanism 23 reaches its rearmost position.

In operation, let it be assumed that the hose 61 is connected to a source of compressed air, not shown, and that the feeding motor mechanism 23 occupies its rearmost position on the shell 27, FIG. 1, with the slide 24 engaging the abutment bar 94. In this position the abutment plate 93 keeps the supply valve body 62 depressed with the opening in the partition 65 closed thereby preventing operation of the rock drill 20. The reversing valve 68 and its cooperating parts are in the position illustrated in FIG. 13, and compressed air is thus directed from the constantly pressurized conduit 67 via the conduit 75 to the diaphragm motor 54. Via its pawl 57b the motor 54 engages the cogwheel 52 and exerts a holding torque thereagainst which is transmitted over the shaft 49 to the gear 50. Through its engagement with the rack 51 the gear 50 forces the slide 24 to its rearmost position against the abutment bar 94 and resists over the slide 24, the rock drill 20, the retainer 29, the drill steel 31, and the drill bit 32 extension of the drill steel centralizer 37 under the action of its spring 40. Simultaneously the spring chamber of the diaphragm motor 53 receives air via the cross conduit 78 whereby its pawl 57a is kept out of engagement with the cogwheel 52.

For starting forward feed of the rock drill 20 the operating member 92 is depressed to bring the longitudinal lever 88 into the locked position with the button 72 of the reversing valve 68 depressed and said valve in the forward feed position. Compressed air is now directed from the conduit 73 to the reduction valve 74 and to the diaphragm motor 53 as well as to the spring chamber of the diaphragm motor 54 via the cross conduit 77. Simultaneously therewith the conduit 75 and the spring chamber of the diaphragm motor 53 are vented via one of the exhaust openings 76. As a result, the pawl 57b of the motor 54 is immediately retracted from the cogwheel 52 while the pawl 57a of the motor 53 starts reciprocation and stepwise rotation of the cogwheel 52. Air in the reduction valve 74 moves the plunger 82 outwardly and brings its detent in engagement with the cogwheel 52. The rotation of the cogwheel 52 is transmitted via the shaft 49 to the gear 50 which rolls along the rack 51 producing a sliding forward motion of the feeding motor mechanism 23 and the rock drill 20. To begin with the stem of the supply valve 60 because of its spring bias remains stationary in contact with the abutment plate 93, so that the aperture in the partition 65 will be opened by reason of the forward feed, whereupon compressed air can pass to the conduit 64 to start operation of the rock drill 20. Forward feed of the drill bit 32 allows extension of the drill steel centralizer 37 under the action of the spring 40 until the rock face is contacted, whereupon the hole can be started with the centralizer firmly guiding the drill steel 31. Feeding and drilling will then continue until the hole has been drilled to the desired depth.

The depth drilled is defined by the position of the camplate 90 which at the proper moment contacts the transverse lever 85 whereupon the still working forward feed causes turning of the arrested transverse lever 85 so that the notch 86 is turned away from the longitudinal lever 88, at which instant the spring 71 will shift the valve body 70 to its backward feed position, FIG. 13. The conduit 73 will now be exhausted via one of the exhaust passages 76 so that the plunger 82 can be retracted by its spring and the spring chamber of the diaphragm motor 54 can be emptied via the cross conduit 77. On the other hand compressed air will now be conducted from the conduit 67 to the conduit 75 pressurizing via the cross conduit 78 the spring chamber of the diaphragm motor 53 and starting reciprocation of pawl 57b of the motor 54. The pressure in the spring chamber of the diaphragm motor 53 produces immediate retraction of the pawl 57a. During reciprocation of the motor 54 the cogwheel 52 is rotated in the reverse direction to produce backward feed movement of the feeding motor mechanism 23 in unison with the rock drill 20. With the feed mechanism 23 approaching its rearmost position on the shell 27, the drill bit 32 will eventually engage the shoulders 44 on the drill steel centralizer 37 and will cause retraction of the centralizer in unison with the feeding mechanism 23 against the action of the spring 40.

Just prior to termination of the backward feed movement the stem of the supply valve body 62 will be arrested by the abutment plate 93, and while the feed motor mechanism 23 continues to its rearmost position the arrested supply valve body 62 will close the aperture in the partition 65, thereby interrupting the supply of compressed air to the rock drill 20 when the backward feed movement comes to an end.

The above described automated feeding and drilling cycle will obviously be repeated each time the operating member 92 is actuated.

In the present invention the above automatic drilling system is combined with a system for automatically positioning the shell to a plurality of predetermined successive drilling locations, FIGS. 1-8, so that a row of spaced holes can be drilled fully automatically according to a predetermined program. To this end there is provided a rectangular frame 100 which is affixed as by welding to a suitable number of carrying irons 101 to be supported by and affixed to any suitable conventional drill support or wagon, not shown, on which the irons together with the frame 100 can be elevated to and selectively supported in various heights. The longer sides of the frame 100 are formed by channel irons 103. Cylindrical elongated guide bars 102 extend in spaced parallel relation relative to each other inside of the channel irons 103 and are fixedly mounted to the shorter sides of the frame 100. On the guide bars 102 bearings 104 are longitudinally slidably mounted and to the bearings 104 there is attached as by welding a slide 105 which extends transversely to the guide bars 102 and has formed parallel side walls 106 thereon.

Centrally to the underside of the slide 105 there is attached a feed nut 107 (FIG. 6) with its axis disposed in parallel relation to the guide bars 102. The feed nut 107 has a smooth cylindrical bore 108 centrally therethrough which receives rotatably therethrough a screw spindle 109 extending in parallel relation to the guide bars 102 and journalled at its ends centrally in the shorter sides of the frame 100. An endless thread 110 is machined into the screw spindle 109 and is composed of opposite intersecting helices merging into one another at the opposed ends of the screw spindle 109, thereby forming the endless screw thread 110. In a vertical bore 108a intersecting the through bore 108 in the feed nut 107 there is pivotally mounted a follower 111 adapted to engage and to follow the endless thread 110 so that, when the spindle 109 is rotated, an axial thrust is exerted on the feed nut 107 whereby the slide 105 is moved along the guide bars 102.

On one end of the screw spindle 109 projecting beyond one of the shorter sides of the frame 100 there is keyed a cogwheel 112. Adjacent the cogwheel 112 there is provided a pressure fluid driven motor 114 for driving the cogwheel. Preferably such motor is a reciprocating diaphragm motor of the type similar to the motors 53, 54 shown in FIG. 11 and disclosed in full detail in the above mentioned copending application Ser. No. 235,961. The motor 114 is mounted on the side wall of the frame 100 adjacent the cogwheel 112 with its driving rod 115 disposed substantially tangentially to the cogwheel 112 and its driving pawl 113 cooperating during reciprocation of the rod 115 with the cogwheel 112 in a manner to rotate it and the screw spindle 109 uni-directionally step by step. In a cylinder 116 (FIG. 2) mounted on the frame 100 adjacent the cogwheel 112 oppositely with respect to the motor 114 there is provided a spring pressed plunger 117 having a detent formed at its tip whereby the cogwheel 112 is engaged. The plunger 117 forms a one-way slip device and arresting means whereby the cogwheel 112 is prevented from rotating when the pawl 113 of the motor 114 is in idle position.

The intermediate portion of the feed shell 27 carrying the automated drilling equipment thereon is mounted on the slide 105 of the frame 100. Transverse bolts 120, FIG. 8, are inserted through holes in the side walls 106 of the slide 105 passing through spacing tubes 121 and holes in the feed shell 27 and firmly affixing the shell to the slide 105.

The pressure fluid circuitry for performing automatic lateral displacements of the feed shell 27 includes a pressure fluid supply line 122 (FIG. 1) connected to a suitable pressure fluid source, not shown. The supply line 122 passes via a main valve 123 capable of permitting closing or opening the supply line 122 on to a rear control valve 124 mounted at the rear end of the feed shell 27. In the rear valve 124 there is provided a slidable valve body 125 which is spring biased in a manner to protrude forwardly from the valve 124, FIG. 9, in which position the rear valve 124 by means of a land closes the fluid supply line 122. The feeding motor mechanism 23 carries at its rear end an abutment plate 126 and in the rearmost position of the mechanism 23 said plate 126 depresses the protruding end of the valve body 125 whereby the control valve 124 is opened, FIG. 1, establishing communication between the line 122 and a conduit 127. To the underside of the central portion of the feed shell 27 there is connected a bracket 128 carrying an intermediate control valve 129. The intermediate control valve 129 carries slidably therein a valve body 130 which protrudes with one end from the control valve 129. The valve body is spring biased and lands and grooves thereon are adapted to connect in the projected position thereof the conduit 127 with a conduit or hose 131, FIG. 1, leading to the reciprocating diaphragm motor 114. In the depressed position of the valve body 130 the grooves and lands thereon connect the conduit 127 to a conduit 132 leading back to the rear end of the feed shell 27 and there being connected to a small cylinder 133 affixed by a bracket to the feed shell 27 in a position to keep the axis of the cylinder 133 coaxial with the operating member 92 of the feeding motor mechanism 23 in the rearmost position of the latter. In the small cylinder 133 a plunger 134 is reciprocable and when the cylinder is pressurized via the conduit 132 the plunger 134 is projected against an inwardly acting spring bias causing depression of the operating member 92. In the intermediate valve 129 there are provided exhaust openings, not shown, in full analogy with the exhaust openings 76 of the reversing valve 68, FIG. 13, so that when the valve body 130 is switched from connecting the conduit 127 with the hose 131 to the depressed position connecting the conduit 127 with the conduit 132, the disconnected conduit or hose will always be relieved to atmosphere.

As soon as pressure fluid is supplied via the line 122 and the main valve 123 to the rear valve 124 and as soon as the feed motor mechanism 23 reaches its rearmost position, the control valve 124 will be opened passing pressure fluid on to the conduit 127 and on to the intermediate control valve 129. With the valve body 130 thereof projected the pressure fluid will continue its course via the hose 131 to the diaphragm motor 114 causing same to reciprocate and to rotate the cogwheel 112 and the screw spindle 109 uni-directionally. The follower 111 in the feed nut 107 causes the feed nut 107 and the slide 105 to follow the endless thread 110 in the screw spindle 109 whereby the feed shell is reciprocated from one side of the frame 100 to the other and back again continuously as long as air is passed on to the motor 114. The reciprocatory motion of the motor 114 can be interrupted only by depression of the valve body 130 of the intermediate valve 129 and there is provided a mechanism to be described hereinafter which according to a predetermined program causes said depression each time a hole has to be drilled. Such depression of the valve body 130 will obviously cause shifting of the air delivery from the hose 131 and motor 114 to the conduit 132 and the small cylinder 133. This causes the plunger 134 therein to immediately depress the operating member 92 of the feeding motor mechanism 23 so that movement thereof in the forward direction away from the rear valve 124 is started. The spring bias acting on the valve body 125 will now move the valve body 125 forwardly closing the air supply to the conduit 127 and the intermediate valve 129.

The impulses for depression and switching of the intermediate valve 129 are given by an elongated cam bar 135, FIG. 3, extending along and in parallel relation to one of the longer sides of the frame 100 and having its cams pointing downward. On the cam bar there are arranged axially spaced radial abutments 136 each corresponding to one drilling location of the feed shell 27 and drill 20. The abutments 136 are followed by slanting portions 139 on the cam bar 135 beginning near the crests of the abutments 136 and terminated by the straight bottom portions 138 of the cam bar 135.

A follower lever 140 rests against the underside of the cam bar 135 and is pivotally carried on a shaft 141 which extends in parallel but spaced relation with respect to the cam bar 135. A nut screwed on the end of the shaft 141 keeps the lever 140 in axially fixed position on the shaft 141 while permitting pivotal motion thereof. A portion of the lever 140 extends past the shaft 141 oppositely to the cam bar 135 and provides by its weight a bias urging the other end of the lever in an upward direction into contact with the cam bar 135. The shaft 141 is axially slidably mounted in depending ears 143a, b forming portions of the bracket 128 and one of them, 143b, carrying the intermediate valve 129. The shaft 141 extends in parallel relation to the intermediate valve 129 and carries at its end opposite to the lever 140 a transverse arm 144 connecting the shaft 141 to the valve body 130 of the intermediate control valve 129. A spring bias acting on the valve body 130 will thus tend to move the shaft 141 together with the follower 140 to the left when viewed in FIGS. 3–6 and 8 and a helical spring 145 carried by the shaft 141 and acting between the ear 143b and the transverse arm 144 adds to the spring bias for moving the shaft 141 to the left. A staple-like element 146, FIG. 3, connected to the ear 143b straddles for guiding purposes the transverse arm 144.

A pusher rod 147, FIGS. 6, 7, is axially movably but non-rotatably mounted in a journal 148 connected to one side of the feed shell 27 in a manner to carry the pusher rod substantially vertically over the inner end of the lever 140 which projects somewhat beyond the cam bar 135. A spring 149 is inserted between the head 150 of the pusher rod 147 and exerts an upward bias thereon. The lower end of the pusher rod 147 is provided with a laterally projecting foot 151 capable of engaging the follower 140 when the pusher rod is depressed whereby the follower 140 may be brought out of engagement with the abutments 136 on the cam bar 135. For depressing the head portion 150 there is provided a cam 152, FIGS. 6 and 9, on the slide 24 of the feeding motor mechanism 23.

The switching of the intermediate control valve 129 by the aid of cam bar 135 and the follower 140 will now be described. As soon as the diaphragm motor 114 starts operation in response to the feeding motor mechanism having reached its rearmost position on the feed shell 27 and having depressed the rear control valve 124, the screw spindle 109 will be rotated. Let it be assumed that the thread follower 111 is in engagement with the helix of the endless thread 110 producing movement of the feed shell 27 in the left hand direction in FIG. 1 during rotation of the spindle 109. The cam lever 140, which as shown in FIGS. 2 and 3 at that instant rides on the crest of one of the abutments 136 of the cam bar 135, permits such left hand movement and follows the cam bar 135 until the lever 140 after having passed the slanting portion 139 and the bottom portion 138 following upon the abutment 136 in question, reaches the next abutment, a position indicated by the vertical dot and dash line traversing the FIGS. 3–5, and is stopped by said abutment, FIG. 4. The cam lever 140, its shaft 141, the transverse arm 144 and the valve body 130 will now be kept stationary while the feed shell continues its movement to the left, since the motor 114 is still receiving air via the intermediate valve 129. This lateral movement continues until the housing of the control valve 129 has moved sufficiently to the left, FIG. 5, relative to the lands on the valve body 130 for interrupting the pressure fluid flow to the motor 114 and for switching the flow over to the small cylinder 133. Movement of the control valve 129 while the cam follower 140 is stationary is performed against the internal spring bias of the valve 129 as well as against the bias of the spring 145. The switching position thus reached will be the next drilling position of the feed shell 27 and since the small cylinder 133 is pressurized its plunger 134 will push against the operating member 92 of the feeding motor mechanism 23 so that feed of the mechanism in unison with the rock drill 20 and the drill steel 31 is started to perform the automatic drilling cycle. As the drilling proceeds an intermediate position will eventually be reached by the feeding motor mechanism 23 on the feed shell 27 and the cam 152 provided on the slide 24 will reach and depress the pusher rod 147, which in its turn depresses the forward end of the cam lever 140. The spring bias acting on the shaft 141 and the valve body 130 will now be free to move the follower to the left along the crest of the abutment 136 from the position of FIG. 5 to a position corresponding to FIG. 3 but disposed on the abutment 136 adjacent and to the left of the dot and dash line. Hereby the intermediate valve 129 is returned to its original position opening the communication to the motor 114 and closing the conduit 132 to the small cylinder 133. Since the feeding motor mechanism 23 now, however, occupies a position somewhere on the feed shell 27, the rear valve 124 will be kept closed and no air can pass to the motor 114 until the automatic drilling of the hole has been finished and the feeding motor mechanism 23 has returned to its rearmost position.

In the rearmost position the rear control valve 124 is again opened so that lateral movement of the feed shell to the left is started according to the above described cycle until the cam lever 140 has reached the next abutment 136 on the cam bar 135.

These movements to the left according to the program defined by the abutments 136 are repeated until the thread follower 111 reaches the left hand end of the endless screw thread 110 whereupon it will follow the helix producing movement to the right of the feed shell. Obviously such movement to the right will be performed continuously along the entire length of the frame 100 since the cam follower can pass freely over the abutments 136 thanks to the slanting portions 139. At the other end of the screw spindle 109 the thread follower 111 then again return to the helix producing left hand movement and now the feed shell 27 and the drilling equipment thereon will perform automatic drilling each time the cam follower 140 reaches an abutment 136 on the cam bar 135.

When all the desired holes have been drilled, the operator closes the main valve 123 with the feeding motor mechanism 23 in or near its rearmost position, whereupon the frame 100 can be elevated or lowered by the carrying irons 101 resting on some suitable vertically adjustable drill rig portion, not shown, to the next level in which a row of holes is desired.

In case the operator with all the holes in one row finished forgets to close the main valve 123 in time, the drill steel 31 will continue its reciprocation and will re-enter the finished holes in succession one after the other according to the program on the cam bar 135 until the valve 123 is closed.

The came bar 135 is mounted rotatably in opposed journals 153 at the opposite ends of the frame 100. The bar 135 proper is preferably formed by an elongated strip, FIG. 7. Screwed to an elongated central body 154, and with a suitable angular spacing there can be provided on the central body 154 a number of alternative additional cam strips 155 provided with different spacings between the abutments 136 thereon which can be turned down into vertical position so that the drilling program can be changed in the various drilling levels. The chosen cam bar is kept in place by means of a spring-pressed detent 156, FIG. 8, provided in one of the journals 153 and cooperating with indexing grooves on a portion of the central body 154.

The embodiment of the invention above described and illustrated in the drawings should only be considered as an example and the invention may be modified within the scope of the following claims.

What I claim is:

1. An automated rock drill positioning support for positioning a rock drill to a plurality of predetermined successive drilling locations for drilling a row of spaced holes comprising a frame, a feed shell on said frame, a rock drill slidably carried on said shell, said shell having feeding means thereon for feeding and retracting said rock drill therealong, guiding means on said frame, said shell being movably mounted on said guiding means for successive movements in a direction transverse to said shell from location to location corresponding to said plurality of drilling locations, a motor in operative engagement with said shell and mounted on said frame for moving said shell in said direction, means on said shell responsive to said feeding means in any of said drilling locations retracting said rock drill to a certain position on said shell for opening the supply of power to said motor whereby said shell is moved by said motor from one location towards the next in said plurality of successive locations, means on said shell for cutting off the supply of power to said motor, and a shifting mechanism having cooperating parts carried by said shell and said frame and being responsive to said shell reaching said next location to cause actuation of said cut-off means whereby the supply of power to said motor is cut off.

2. An automated rock drill positioning support as set forth in claim 1 in which a drill steel centralizer is provided at the forward end of said shell, means for carrying said centralizer longitudinally slidably on said shell, resilient means between said shell and said centralizer for urging said centralizer in the feeding direction, and means movable in unison with said rock drill and engageable with said centralizer for retracting it against the action of said resilient means when said rock drill during its retraction reaches proximity of said certain position on said shell.

3. An automated rock drill support as described in claim 1 in which said guiding means includes a pair of parallel elongated guide members disposed thereon and bearing means longitudinally movably mounted on said guide members with said feed shell attached thereto and traversing said guide members, and in which said guiding means includes a screw connected to said motor for rotation thereby, a thread on said screw composed of opposite intersecting helices merging into one another at each end of said screw, and thread engaging means connected to said shell and alternately following said helices for reciprocating said shell along said guide members in one direction or the other during the rotation of said motor.

4. An automated rock drill positioning support for positioning a rock drill to a plurality of predetermined successive drilling locations for drilling a row of spaced holes comprising a frame, a feed shell on said frame, a rock drill slidably carried on said shell, said shell having feeding means thereon for feeding and retracting said rock drill therealong, guiding means on said frame, said shell being movably mounted on said guiding means for successive movements in a direction transverse to said shell from location to location corresponding to said plurality of drilling locations, a pressure fluid actuated motor in operative engagement with said shell and mounted on said frame for moving said shell in said direction, a pressure fluid source, a pressure fluid supply line connected to said source and to said motor, a first valve included in said line and mounted on said shell, said first valve being normally closed thereby keeping communication from said source through said line to said motor closed, means responsive to said feeding means in any of said drilling locations retracting said rock drill to a rearmost position on said shell for opening said first valve whereby communication through said line to said motor is opened and said shell is moved by said motor from one location towards the next in said plurality of successive locations, a second valve included in said line between said first valve and said motor, said second valve being movable between a normal position in which communication through said line to said motor is open and a cut-off position, in which communication through said line to said motor is closed, and a shifting mechanism cooperating with said second valve, said shifting mechanism having cooperating parts carried by said shell and said frame and being responsive to said shell reaching said next location to cause shifting of said second valve from said normal to said cut-off position.

5. An automated rock drill positioning support as set forth in claim 4 in which there is provided a pressure fluid actuated starting means on said shell for said feeding means for starting feeding of said rock drill along said shell from said rearmost position, a branch line between said second valve and said starting means, and said second valve in its cut-off position establishing a communication from said source through said supply line to said branch line and said starting means for starting feeding of said rock drill.

6. An automated rock drill support as set forth in claim 4 in which there is provided a resetting means on said shell engageable with said shifting mechanism and responsive to said rock drill having been fed along said shell as certain distance from said rearmost position for resetting said second valve from said cut-off position to said normal position.

7. An automated rock drill support as set forth in claim 4 in which a drill steel centralizer is provided at the forward end of said shell, means for carrying said centralizer longitudinally slidably on said shell, resilient means between said shell and said centralizer for urging said centralizer in the feeding direction, and means movable in unison with said rock drill and engageable with said centralizer for retracting it against the action of said resilient means when said rock drill during its retraction reaches proximity of said *rearmost* position on said shell.

8. An automated rock drill positioning support for positioning a rock drill to a plurality of predetermined successive drilling locations for drilling a row of spaced holes comprising a frame having a pair of parallel elongated guide members thereon, bearing means longitudinally movably mounted on said guide members, a feed shell attached to said bearing means and traversing said guide members, a rock drill slidably carried on said shell, said shell having feeding means thereon for feeding and retracting said rock drill therealong and being movably mounted on said guide members in a direction transverse to said shell successively from location to location corresponding to said plurality of drilling locations, thread engaging means connected to said shell, a screw rotatably mounted on said frame and cooperating with said thread engaging means for moving said shell in said direction upon rotation of said screw, a motor on said frame for rotating said screw, an elongated cam on said frame extending in parallel relation to said guide members and having a series of longitudinally spaced cam surfaces thereon each corresponding to one of said drilling locations, means on said shell responsive to said feeding means in any of said drilling locations retracting said rock drill to a certain position on said shell for opening the supply of power to said motor whereby said shell is moved by said motor and screw from one location towards the next in said plurality of successive locations, means on said shell for cutting off the supply of power to said motor, and a shifting mechanism movable in unison with said shell and including a cam follower on and movable along said cam, said shifting mechanism during movement of said shell responsive to said follower reaching a cam surface on said cam corresponding to said next location to cause actuation of said cut-off means whereby the supply of power to said motor is cut-off.

9. An automated rock drill positioning support for positioning a rock drill to a plurality of predetermined successive drilling locations for drilling a row of spaced holes comprising a frame, having elongated guiding means thereon, a feed shell traversing said guiding means, a rock drill slidably carried on said shell, said shell having feeding means thereon for feeding and retracting said rock drill therealong and being movably mounted on and longitudinally of said guiding means in a direction transverse to said shell successively from location to location corresponding to said plurality of drilling locations, a motor in operative engagement with said shell and mounted on said frame for moving said shell in said direction, an elongated cam on said frame extending in parallel relation to said guiding means and having a series of longitudinally spaced cam surfaces thereon each corresponding to one of said drilling locations, means on said shell responsive to said feeding means in any of said drilling locations retracting said rock drill to a certain position on said shell for opening the supply of power to said motor whereby said shell is moved by said motor along said guiding means from one location towards the next in said plurality of successive locations, means on said shell for cutting off the supply of power to said motor, and a shifting mechanism movable in unison with said shell and including a cam follower on and movable along said cam means, said shifting mechanism during movement of said shell responsive to said follower reaching a cam surface on said cam means corresponding to said next location to cause actuation of said cut-off means whereby the supply of power to said motor is cut off.

10. An automated rock drill positioning support for positioning a rock drill to a plurality of predetermined successive drilling locations for drilling a row of spaced holes comprising a frame having elongated guiding means thereon, a feed shell traversing said guiding means, a rock drill slidably carried on said shell, said shell having feeding means thereon for feeding and retracting said rock drill therealong and being movably mounted on and longitudinally of said guiding means for movement in a direction transverse to said shell successively from location to location corresponding to said plurality of drilling locations, a pressure fluid actuated motor in operative engagement with said shell and mounted on said frame for moving said shell in said direction, a pressure fluid source, a pressure fluid supply line connected to said source and to said motor, a first valve included in said line and mounted on said shell, said first valve being normally closed thereby keeping communication from said source through said line to said motor closed, means responsive to said feeding means in any of said drilling locations retracting said rock drill to a rearmost position on said shell for opening said first valve whereby communication through said line to said motor is opened and said shell is moved by said motor along said guiding means from one location towards the next in said plurality of successive locations, a second valve included in said line between said first valve and said motor, said second valve being movable between a normal position in which communication through said line to said motor is open and a cut-off position, in which communication through said line to said motor is closed, an elongated cam on said frame extending in parallel relation to said guiding means and having a series of longitudinally spaced cam surfaces thereon each corresponding to one of said drilling locations, and a shifting mechanism movable in unison with said shell and including a cam follower on and movable along said cam, said shifting mechanism during movement of said shell responsive to said follower reaching a cam surface on said cam corresponding to said next location to cause shifting of said second valve from said normal to said cut-off position.

11. An automated rock drill positioning support for positioning a rock drill to a plurality of predetermined successive drilling locations for drilling a row of spaced holes comprising a frame having a pair of parallel elongated guide members thereon, bearing means longitudinally movably mounted on said guide members, a feed shell actuated to said bearing means and traversing said guide members, a rock drill slidably carried on said shell, said shell having feeding means thereon for feeding and retracting said rock drill therealong and being movably mounted on said guide members in a direction transverse to said shell, a rotary motor mounted on said frame, a screw connected to said motor for being rotated uni-directionally thereby, a thread on said screw composed of opposite intersecting helices merging into one another at the opposed ends of said screw, a thread engaging means connected to said shell and engaging said thread for reciprocating said shell along said guide members, means for cutting off the supply of power to said motor, a cam bar on said frame extending in parallel relation to said guide members, a cam follower connected to said shell for movement in unison therewith and along said cam bar, said cam bar presenting during movement of said thread engaging means along one of said helices a succession of longitudinally spaced abutments to said follower each corresponding to one of said plurality of drilling locations, means on said shell responsive to said feeding means in any of said drilling locations retracting said rock drill to a certain position on said shell for opening the supply of power to said motor whereby said shell is moved by said motor and screw from one location towards the next in said plurality of successive locations, a shifting mechanism on said shell responsive to said cam follower reaching said abutments to cause actuation of said cut-off means whereby the supply of power to said motor is cut off, and said cam bar having surfaces thereon permitting said follower to pass freely over said abutments during movement of the thread engaging means along the other of said helices.

12. An automated rock drill support as set forth in claim 11 in which there is provided a resetting means on said shell engageable with said follower and responsive to said rock drill having been fed along said shell a certain distance from said rearmost position for causing movement of said follower past the abutment reached thereby.

13. An automated rock drill positioning support for positioning a rock drill to a plurality of predetermined successive drilling locations for drilling a row of spaced holes comprising a frame, a feed shell on said frame, a drilling unit slidably mounted on and along said shell, said drilling unit including in intercoupled relation a power operated rock drill and a power operated feeding motor mechanism, said mechanism having means included therein for imparting forward and backward feed movement to said unit along said shell, a power source, a first power line connected to said power source and having a first branch connected to said rock drill and a second branch connected to said feeding motor mechanism, reversing means in said second branch operable for controlling the power supplied to said second branch and said feeding motor mechanism and shiftable between forward and backward feed position for controlling the direction of feed of said feeding motor mechanism, shifting means in operative engagement with said reversing means for shifting it from said forward to said backward feed position, a forward abutment at a selective forward position on said shell and in the path of feeding movement of said shifting means for causing shifting of said reversing means from said forward to said backward feed position as a result of said shifting means contacting said forward abutment, an operating member in said unit actuatable for shifting said reversing means from said backward to said forward feed position, guiding means on said frame, said shell being movably mounted on said guiding means for successive movements in a direction transverse to said shell from location to location corresponding to said plurality of drilling locations, a motor in operative engagement with said shell and mounted on said frame for moving said shell in said direction, a second power line connecting said motor to said source, first control means on said shell and in said second line and responsive to said feeding motor mechanism in any of said drilling locations retracting said unit to a rearmost position on said shell for opening the supply of power to said motor whereby said shell is moved by said motor from one location towards the next in said plurality of successive locations, second control means on said shell and connected in series with said first control means in said second line and movable between open and cut-off position for cutting off the supply of power to said motor, and a shifting mechanism having cooperating parts carried by said shell and said frame and being responsive to said shell reaching said next location to cause movement of said second control means from said open to said cut-off position whereby the supply of power to said motor is cut off.

14. An automated rock drill positioning support as set forth in claim 13 in which there is provided a third control means in said feeding motor mechanism and said first branch shiftable between normally open and closed position for controlling the power supply to said rock drill, means providing an opening bias on said third control means, and a rear abutment on said shell cooperating with said third control means for automatically moving said third control means against said opening bias from said open to said closed position when said unit reaches proximity of and moves to said rearmost position.

15. An automated rock drill positioning support as set forth in claim 13 in which there is provided a power operated actuator on said shell cooperating with said operating member in the rearmost position of said unit, there being provided a branch line between said second control means and said actuator, and said second control means having means therein for opening in the motor power cut-off position thereof the power supply to said branch line and actuator whereby forward feed of said unit is started.

16. An automated rock drill positioning support as set forth in claim 15 in which there is provided a resetting means on said shell cooperating with said shifting mechanism of said second control means for causing movement of said second control means from said cut-off position to said open position in response to said unit having been fed in forward direction along said shell a certain distance from said rearmost position.

17. An automated rock drill positioning support for positioning a rock drill to a plurality of predetermined successive drilling locations for drilling a row of spaced holes comprising a frame, a feed shell on said frame, a drilling unit slidably mounted on and along said shell, said drilling unit including in intercoupled relation a pressure fluid operated rock drill and a pressure fluid operated feeding motor mechanism, said mechanism having means included therein for imparting forward and backward feed movement to said unit along said shell, a pressure fluid source, a first power line connected to said source and having a first branch connected to said rock drill and a second branch connected to said feeding motor mechanism, a reversing valve in said second branch operable for controlling the power supplied via said second branch to said feeding motor mechanism and shiftable between forward and backward feed position for controlling the direction of feed of said feeding motor mechanism, shifting means in operative engagement with said reversing valve for shifting it from said forward to said backward feed position, a forward abutment at a selective forward position on said shell and in the path of feeding movement of said shifting means for causing shifting of said reversing valve from said forward to said backward feed position as a result of said shifting means contacting said forward abutment, an operating member in said unit actuatable for shifting said reversing means from said backward to said forward feed position, guiding means on said frame, said shell being movably mounted on said guiding means for successive movements in a direction transverse to said shell from location to location corresponding to said plurality of drilling locations, a pressure fluid actuated motor in operative engagement with said shell and mounted on said frame for moving said shell in said direction, a second power line connecting said motor to said source, a normally closed rear control valve rearwardly on said shell and in said second line and responsive to said feeding motor mechanism in any of said drilling locations retracting said unit to a rearmost position on said shell for opening the supply of pressure fluid to said motor whereby said shell is moved by said motor from one location towards the next in said plurality of successive locations, an intermediate control valve mounted in intermediate position on said shell, said intermediate valve being connected in series with said rear valve in said second line and being movable between open and cut-off position for cutting off the supply of pressure fluid to said motor, a shifting mechanism having cooperating parts carried by said shell and said frame and being responsive to said shell reaching said next location to cause movement of said intermediate valve from said open to said cut-off position whereby the supply of power to said motor is cut off, a pressure fluid operated actuator on said shell cooperating with said operating member in the rearmost position of said unit, a branch line between said intermediate valve and said actuator, and said intermediate valve having means therein for opening in the cut-off position thereof the pressure fluid supply to said branch line and actuator whereby forward feed of said unit is started.

18. An automated rock drill positioning support as set forth in claim 17 in which there is provided a third control valve in said feeding motor mechanism and said first branch shiftable between normally open and closed position for controlling the pressure fluid supply to said rock drill, means providing an opening bias on said third control valve, and a rear abutment on said shell cooperating with said third control valve for automatically moving said third control valve against said opening bias from said open to said closed position when said unit reaches proximity of and moves to said rearmost position.

19. An automated rock drill positioning support for positioning a rock drill to a plurality of predetermined successive drilling locations for drilling a row of coplanar spaced holes defining one of a multitude of working planes for the rock drill including in the cut pattern to be drilled, said support comprising a frame having elongated guiding means thereon, a feed shell traversing said guiding means, a rock drill slidably carried on said shell, said shell having feeding means thereon for feeding and retracting said rock drill therealong and being movably mounted on and longitudinally of said guiding means in a direction transverse to said shell successively from location to location corresponding to said plurality of drilling locations in said one working plane, a motor in operative engagement with said shell and mounted on said frame for moving said shell in said direction, an elongated cam carrier on said frame extending in parallel relation to said guiding means and having a number of elongated parallel cams thereon each having a series of longitudinally spaced cam surfaces corresponding each to one of said drilling locations, means on said shell responsive to said feeding mean in any of said drilling locations retracting said rock drill to a certain position on said shell for opening the supply of power to said motor whereby said shell is moved by said motor along said guiding means from one location towards the next in said plurality of successive locations, means on said shell for cutting off the supply of power to said motor, a shifting mechanism movable in unison with said shell and including a cam follower on and movable along one of said cams, said shifting mechanism during movement of said shell responsive to said follower reaching a cam surface on said one cam corresponding to said next location to cause actuation of said cut off means whereby the supply of power to said motor is cut off, and means for moving said cam carrier to selectively present any of said plurality of cams to said follower for changing the shifting program for said shifting mechanism to suit the selected actual working plane of the rock drill.

References Cited by the Examiner
UNITED STATES PATENTS

| | | | |
|---|---|---|---|
| 340,251 | 4/1886 | Saunders | 173—44 |
| 421,491 | 2/1890 | Githens | 173—44 |
| 1,425,613 | 8/1922 | Stage | 173—19 |
| 1,766,224 | 6/1930 | Montevaldo | 74—58 |
| 1,838,459 | 12/1931 | Smith et al. | 173—19 |
| 2,350,660 | 6/1944 | Curtis | 308—3.9 |
| 2,623,419 | 12/1952 | Wales | 77—5 |
| 2,828,109 | 3/1958 | Dellner | 308—3.9 |
| 2,830,475 | 4/1958 | Jones | 77—32.2 |

FRED C. MATTERN, Jr., *Primary Examiner.*

L. P. KESSLER, *Assistant Examiner.*